US011455354B2

(12) United States Patent
Hasegawa et al.

(10) Patent No.: US 11,455,354 B2
(45) Date of Patent: *Sep. 27, 2022

(54) VISUALIZING QUERY RESULTS TO IMPROVE QUALITY OF SUBSEQUENT SEARCHES

(71) Applicant: Breakwater Solutions LLC, Austin, TX (US)

(72) Inventors: Mihoko Hasegawa, Tokyo (JP); Ryoji Kurosawa, Tokyo (JP); Kensuke Matsuoka, Kamagaya (JP); Fumihiko Terui, Tokyo (JP)

(73) Assignee: Breakwater Solutions LLC, Austin, TX (US)

( * ) Notice: Subject to any disclaimer, the term of this patent is extended or adjusted under 35 U.S.C. 154(b) by 529 days.

This patent is subject to a terminal disclaimer.

(21) Appl. No.: 16/422,781

(22) Filed: May 24, 2019

(65) Prior Publication Data
US 2019/0311015 A1    Oct. 10, 2019

Related U.S. Application Data

(63) Continuation of application No. 15/229,305, filed on Aug. 5, 2016, now Pat. No. 10,394,914.

(51) Int. Cl.
*G06F 17/30* (2006.01)
*G06F 16/9535* (2019.01)
(Continued)

(52) U.S. Cl.
CPC ........ *G06F 16/9535* (2019.01); *G06F 3/0482* (2013.01); *G06F 3/0486* (2013.01);
(Continued)

(58) Field of Classification Search
CPC .... G06F 16/9535; G06F 16/93; G06F 16/248; G06F 16/2428; G06F 3/0486;
(Continued)

(56) References Cited

U.S. PATENT DOCUMENTS 5,966,126 A * 10/1999 Szabo ................. G06F 16/2428
 715/762
6,601,057 B1    7/2003 Underwood et al.
(Continued)

OTHER PUBLICATIONS

S. Jones, "VQuery: a Graphical User Interface for Boolean Query Specification and Dynamic Result Preview", 1998, University of Waikato, Hamilton, New Zealand. (Year: 1998).*
(Continued)

*Primary Examiner* — Hung D Le

(57) ABSTRACT

A computer-implemented method, system and computer program product for improving the quality of subsequent searches. A request is received from a user to perform a search using the term(s) provided by the user. A search is then performed using the provided term(s). A representation of the search result is depicted as an area (e.g., bubble) with terms of interest displayed outside the area. The area represents a set of documents that were found in the performed search and the terms of interest represent terms that may be of interest to the user based on this set of documents. These terms of interest may be selected by the user to adjust the search result. In this manner, the user is presented with an intuitive view as to how different terms or different searches will have an impact on the search results thereby improving the quality of subsequent searches.

18 Claims, 15 Drawing Sheets

(51) Int. Cl.
*G06F 3/0486* (2013.01)
*G06F 3/0482* (2013.01)
*G06F 16/93* (2019.01)
*G06F 16/248* (2019.01)
*G06F 16/242* (2019.01)

(52) U.S. Cl.
CPC ........ G06F 16/248 (2019.01); G06F 16/2428 (2019.01); G06F 16/93 (2019.01)

(58) Field of Classification Search
CPC ........ G06F 3/0482; G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 6,766,315 B1* | 7/2004 | Bratsos | ............... | G06F 16/9535 |
| 7,769,752 B1* | 8/2010 | Turner | .................. | G06F 16/358 |
| | | | | 707/731 |
| 2002/0078035 A1 | 6/2002 | Frank et al. | | |
| 2003/0140059 A1 | 7/2003 | Ishizaka | | |
| 2005/0283466 A1 | 12/2005 | Dettinger et al. | | |
| 2012/0066216 A1* | 3/2012 | Alexander | .......... | G06F 16/9566 |
| | | | | 707/723 |
| 2012/0221553 A1* | 8/2012 | Wittmer | ................ | G06F 16/904 |
| | | | | 707/E17.014 |
| 2012/0278316 A1 | 11/2012 | Reznik | | |
| 2013/0227413 A1 | 8/2013 | Thorsander et al. | | |
| 2014/0022255 A1 | 1/2014 | Barbouche et al. | | |
| 2014/0164362 A1* | 6/2014 | Syed | ..................... | G06F 16/904 |
| | | | | 707/722 |
| 2014/0317104 A1* | 10/2014 | Isaacs | .................. | G06F 16/248 |
| | | | | 707/728 |
| 2015/0317320 A1* | 11/2015 | Miller | ................... | G06F 16/248 |
| | | | | 707/728 |

OTHER PUBLICATIONS

List of IBM Patents or Patent Applications Treated as Related, Jun. 7, 2019, pp. 1-2.

* cited by examiner

VISUALIZING QUERY RESULTS TO IMPROVE QUALITY OF SUBSEQUENT SEARCHES

TECHNICAL FIELD

The present invention relates generally to searching for information, and more particularly to visualizing query results to improve the quality of subsequent searches.

BACKGROUND

Oftentimes, people perform keyword searches to identify information, such as performing a keyword search on a web search engine (e.g., Google®) to search for information on the World Wide Web. Often, these keyword searches involve entering one or more terms of interest (e.g., weather, Detroit) directed to a subject of interest, such as the weather in the city of Detroit. The search results are generated simply based on the term(s) entered by the user, where the results are typically those that include one or more of the terms entered by the user.

At times though, the user may have more of an interest in the differences in the search results between a prior search and a current search which involved different term(s). For example, the user may have entered the terms of "car" and "accident" in a first search and the terms "motorcycle" and "accident" in a second search. The user may be more interested in the differences in the search results between these searches rather than simply being provided the results of the second search.

Currently, the user is required to enter terms without prior knowledge of how these terms relate to the current search result. That is, the user does not have knowledge as to how each of these terms will have an impact on the search result.

As a result, the user does not currently have an intuitive view of how different terms or different searches will have an impact on the search results.

SUMMARY

In one embodiment of the present invention, a computer-implemented method for improving the quality of subsequent searches comprises receiving a request from a user to perform a first search using one or more terms provided by the user. The method further comprises performing the first search using the one or more terms provided by the user. The method additionally comprises depicting a first representation of a first search result of the first search as a first area with terms of interest displayed outside the first area, where the first area comprises a bubble or a circle, and where the terms of interest comprise one or more of the following: correlated terms in connection with the first search result, high frequency terms in connection with the first search result, synonyms of the one or more provided terms and facet values.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving the quality of subsequent searches. In one embodiment of the present invention, a request is received from a user to perform a search using the term(s) provided by the user. A search is then performed using the provided term(s). A representation of the search result is depicted on the display of the user's client device as an area (e.g., bubble, circle) with terms of interest (e.g., "bird, "room," "ambulance," "Tokyo") displayed outside the area. The area represents a set of documents (e.g., web pages, articles, presentations) that were found in the performed search and the terms of interest represent terms that may be of interest to the user based on this set of documents. The terms of interest may include any of the following: terms with high or low correlation to the current result set, high frequency terms in the current result set, synonyms of the current query terms and facet values (e.g., geographic locations, file types). Upon the user selecting a term of interest, an area (e.g., bubble) may appear indicating the search result set for that term. The user may then perform an operation on this area, such as dragging it to the area representing the prior search result, to perform a query operation (e.g., OR logical operation) using the selected term of interest and the prior search terms to generate a new search result. A region is then depicted on the display of the user's client device between the areas representing the previous and current search results representing a set of documents that is the difference between the previous and current search results, where the region includes new terms of interest for that set of documents. In this manner, the user is presented with an intuitive view as to how different terms or different searches will have an impact on the search results thereby improving the quality of subsequent searches.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
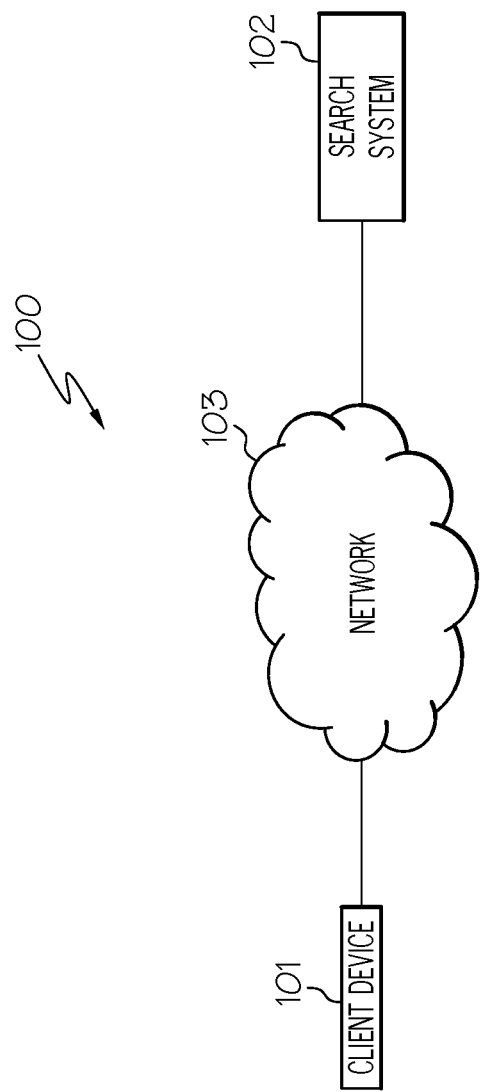
FIG. 1 illustrates a search system configured in accordance with an embodiment of the present invention.

Referring now to the Figures in detail, FIG. 1 illustrates a search system 100 for performing searches (e.g., performing a keyword search on a web search engine to search for information on the World Wide Web) configured in accordance with an embodiment of the present invention. Referring to FIG. 1, search system 100 includes a user using a client device 101 connected to a search system 102 via a network 103. Client device 101 may be a portable computing unit, a Personal Digital Assistant (PDA), a smartphone, a laptop computer, a mobile phone, a navigation device, a game console, a desktop computer system, a workstation, an Internet appliance and the like. It is noted that both client device 101 and the user of client device 101 may be identified with element number 101. A hardware configuration of client device 101 is provided below in connection with FIG. 2.

Referring to FIG. 1, network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Search system 102 is configured to perform searches for information using terms provided by a user of client device 101. For example, search system 102 is configured to perform a search on the World Wide Web using the term(s) provided by the user of client device 101. A description of the hardware configuration of search system 102 is provided below in connection with FIG. 3.

System 100 is not to be limited in scope to any one particular network architecture. System 100 may include any number of client devices 101, search systems 102 and networks 103.

Figure 2:
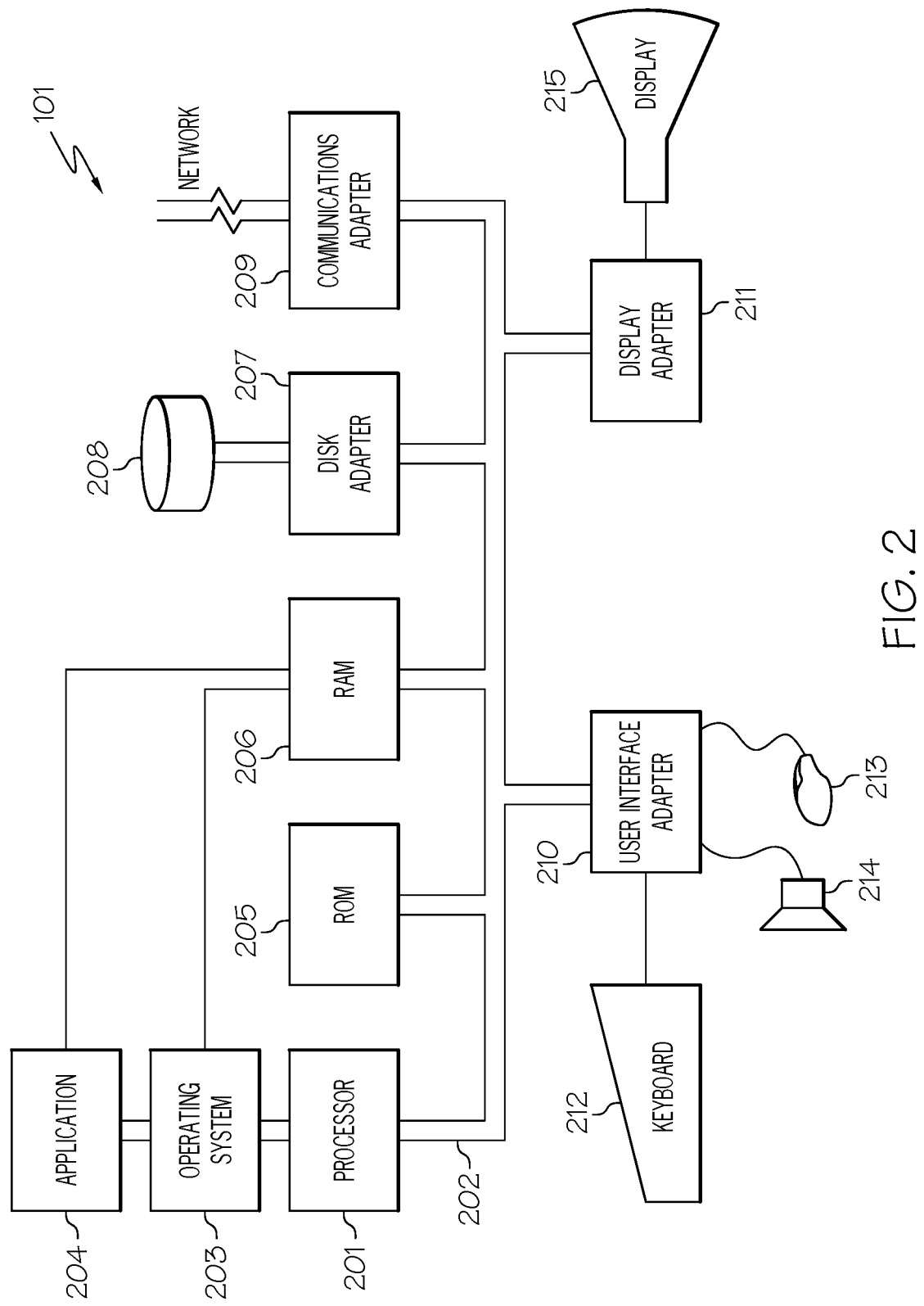
FIG. 2 illustrates a hardware configuration of a client device configured in accordance with an embodiment of the present invention.

Referring now to FIG. 2, FIG. 2 illustrates a hardware configuration of client device 101 (FIG. 1) which is representative of a hardware environment for practicing the present invention. Referring to FIG. 2, client device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser for requesting searches to be performed by search system 102 as discussed further below in connection with FIGS. 4A-4B and 5-14.

Referring again to FIG. 2, read-only memory ("ROM") 205 is coupled to system bus 202 and includes a basic input/output system ("BIOS") that controls certain basic functions of client device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive.

Client device 101 may further include a communications adapter 209 coupled to bus 202. Communications adapter 209 interconnects bus 202 with an outside network (e.g., network 103 of FIG. 1) thereby enabling client device 101 to communicate with other devices (e.g., search system 102 of FIG. 1).

I/O devices may also be connected to client device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client device 101 through keyboard 212 or mouse 213 and receiving output from client device 101 via display 215 or speaker 214. Other input mechanisms may be used to input data to client device 101 that are not shown in FIG. 2, such as display 215 having touch-screen capability and keyboard 212 being a virtual keyboard. Client device 101 of FIG. 2 is not to be limited in scope to the elements depicted in FIG. 2 and may include fewer or additional elements than depicted in FIG. 2.

Figure 3:
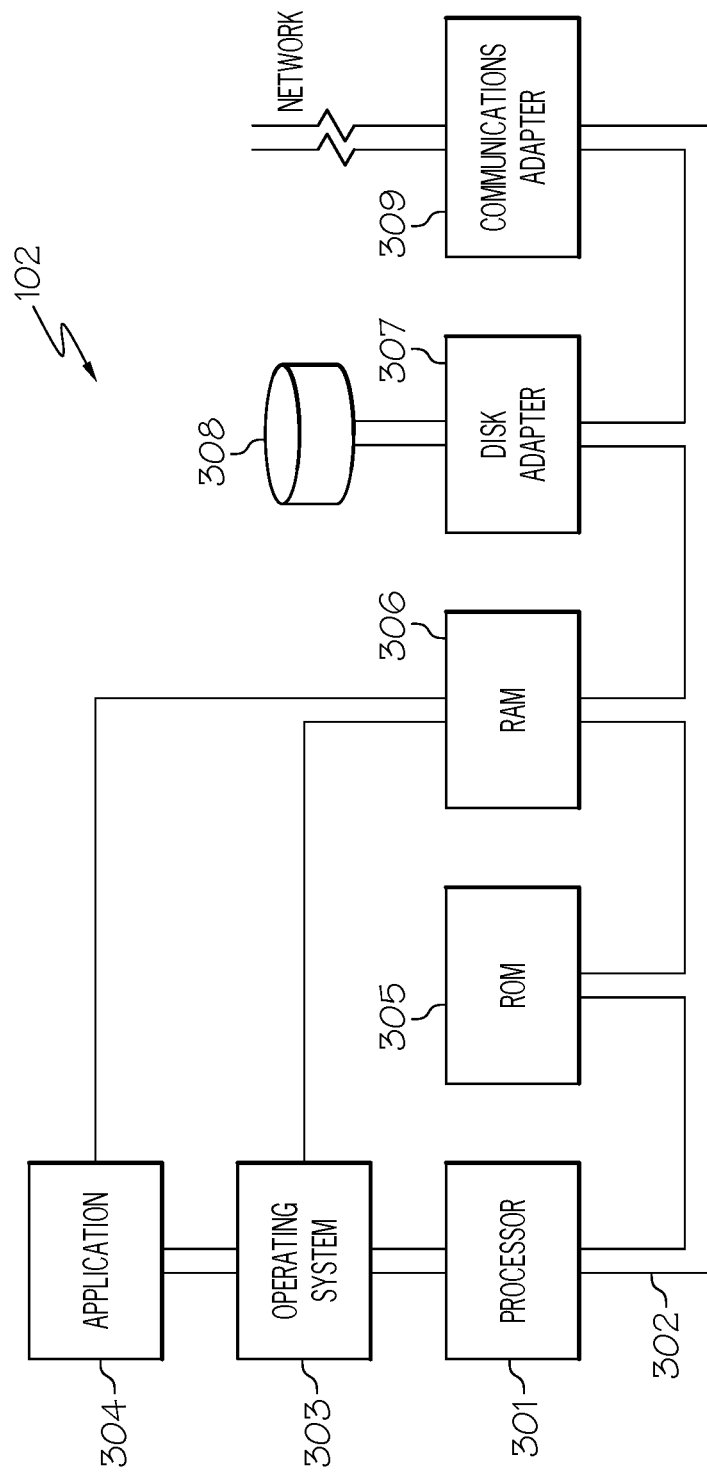
FIG. 3 illustrates a hardware configuration of a search system configured in accordance with an embodiment of the present invention.

Referring now to FIG. 3, FIG. 3 illustrates a hardware configuration of search system 102 (FIG. 1), which is representative of a hardware environment for practicing the present invention. Referring to FIG. 3, search system 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for improving the quality of subsequent searches as discussed further below in association with FIGS. 4A-4B and 5-14.

Referring again to FIG. 3, read-only memory ("ROM") 305 is coupled to system bus 302 and includes a basic input/output system ("BIOS") that controls certain basic functions of search system 102. Random access memory ("RAM") 306 and disk adapter 307 are also coupled to system bus 302. It should be noted that software components including operating system 303 and application 304 may be loaded into RAM 306, which may be search system's 102 main memory for execution. Disk adapter 307 may be an integrated drive electronics ("IDE") adapter that communicates with a disk unit 308, e.g., disk drive. It is noted that the program for improving the quality of subsequent searches, as discussed further below in association with FIGS. 4A-4B and 5-14, may reside in disk unit 308 or in application 304.

Search system 102 may further include a communications adapter 309 coupled to bus 302. Communications adapter 309 interconnects bus 302 with an outside network (e.g., network 103 of FIG. 1) thereby allowing search system 102 to communicate with client device 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, oftentimes, people perform keyword searches to identify information, such as performing a keyword search on a web search engine (e.g., Google®) to search for information on the World Wide Web. Often, these keyword searches involve entering one or more terms of interest (e.g., weather, Detroit) directed to a subject of interest, such as the weather in the city of Detroit. The search results are generated simply based on the term(s) entered by the user, where the results are typically those that include one or more of the terms entered by the user. At times though, the user may have more of an interest in the differences in the search results between a prior search and a current search which involved different term(s). For example, the user may have entered the terms of "car" and "accident" in a first search and the terms "motorcycle" and "accident" in a second search. The user may be more interested in the differences in the search results between these searches rather than simply being provided the results of the second search. Currently, the user is required to enter terms without prior knowledge of how these terms relate to the current search result. That is, the user does not have knowledge as to how each of these terms will have an impact on the search result. As a result, the user does not currently have an intuitive view of how different terms or different searches will have an impact on the search results.

Figure 4A:
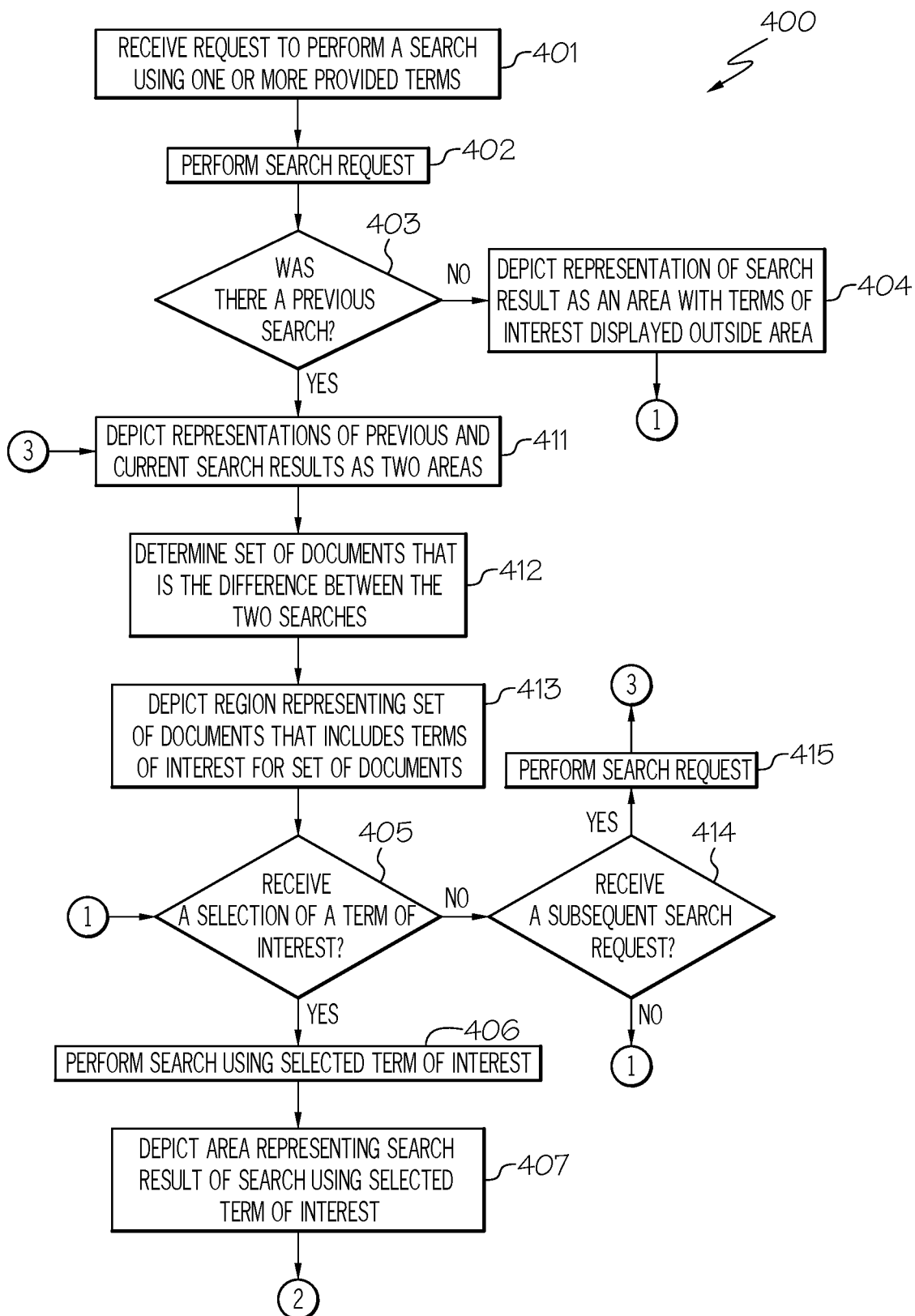
FIGS. 4A-4B are a flowchart of a method for providing an intuitive view as to how different terms or different searches will have an impact on the search results in accordance with an embodiment of the present invention.
Figure 4B:
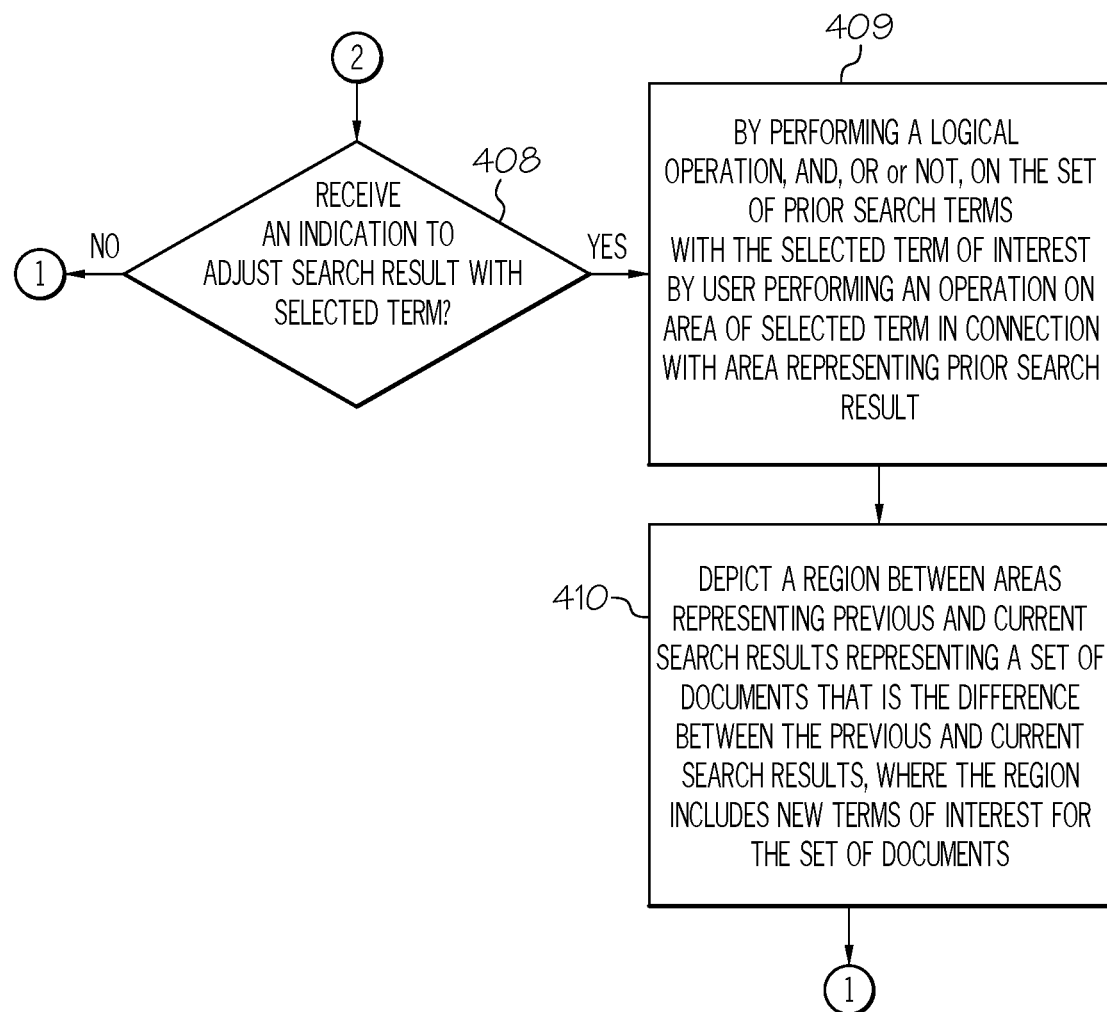
Figure 5:
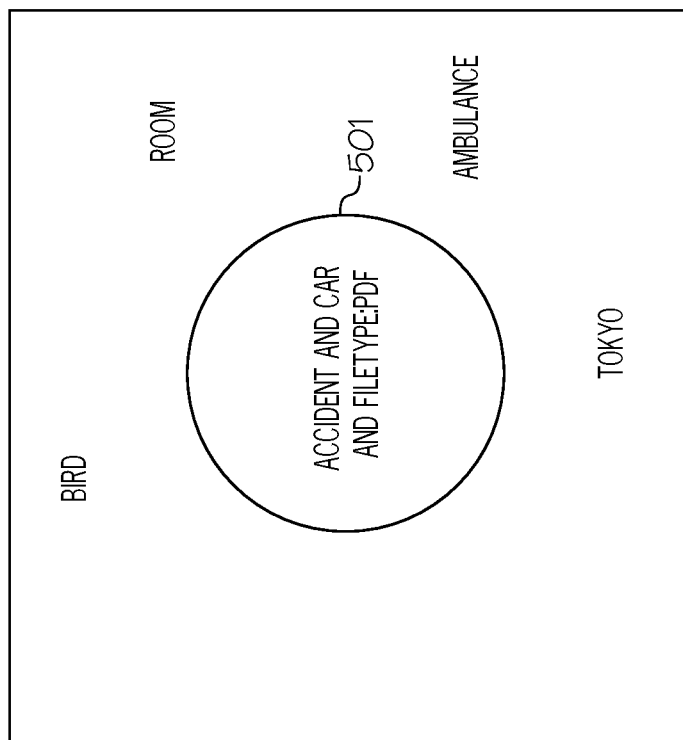
FIG. 5 illustrates depicting an area on the display of the client device representing a search result along with terms of interest being displayed outside the area in accordance with an embodiment of the present invention.
Figure 6:
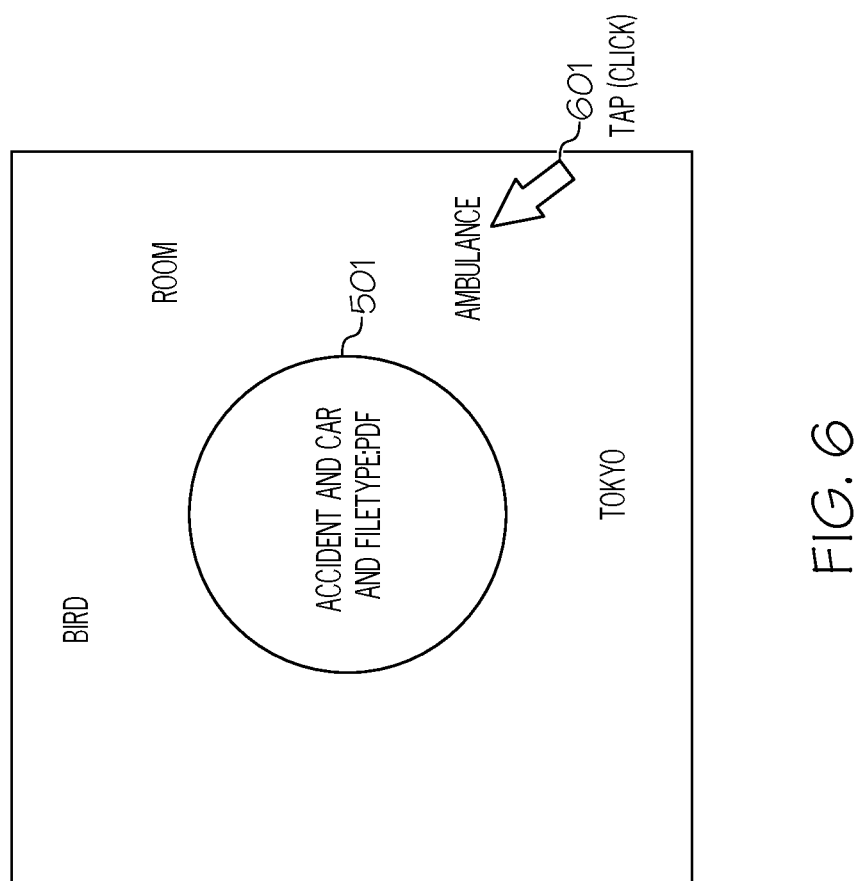
FIG. 6 illustrates selecting a term of interest in accordance with an embodiment of the present invention.
Figure 7:
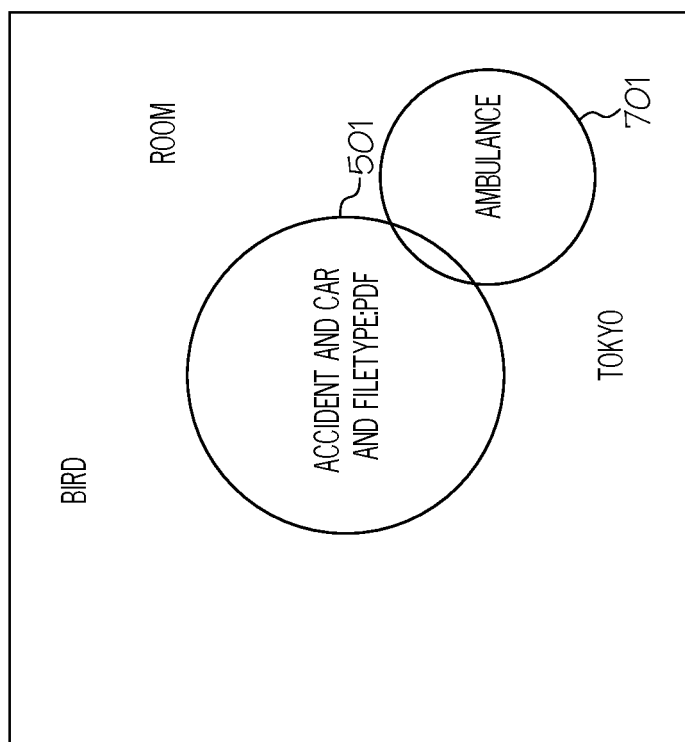
FIG. 7 illustrates depicting an area on the display of the client device representing a search result using the selected term of interest in accordance with an embodiment of the present invention.
Figure 8:
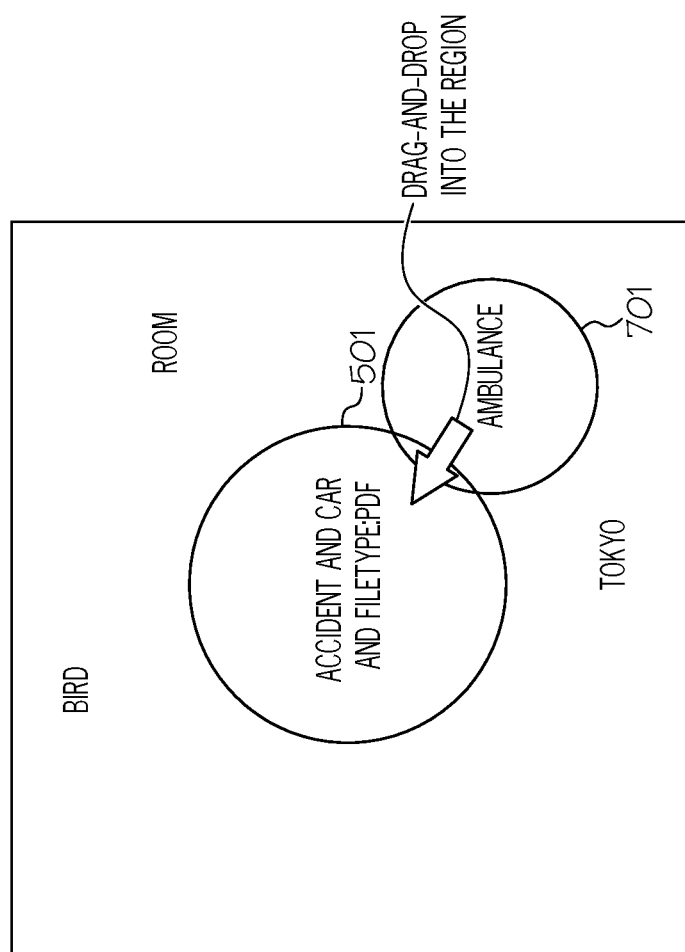
FIG. 8 illustrates adjusting the search result by performing the logical operation of OR on the set of prior search terms with the selected term of interest by the user dragging and dropping the area representing the search result of the selected term of interest into the area representing the prior search result in accordance with an embodiment of the present invention.
Figure 9:
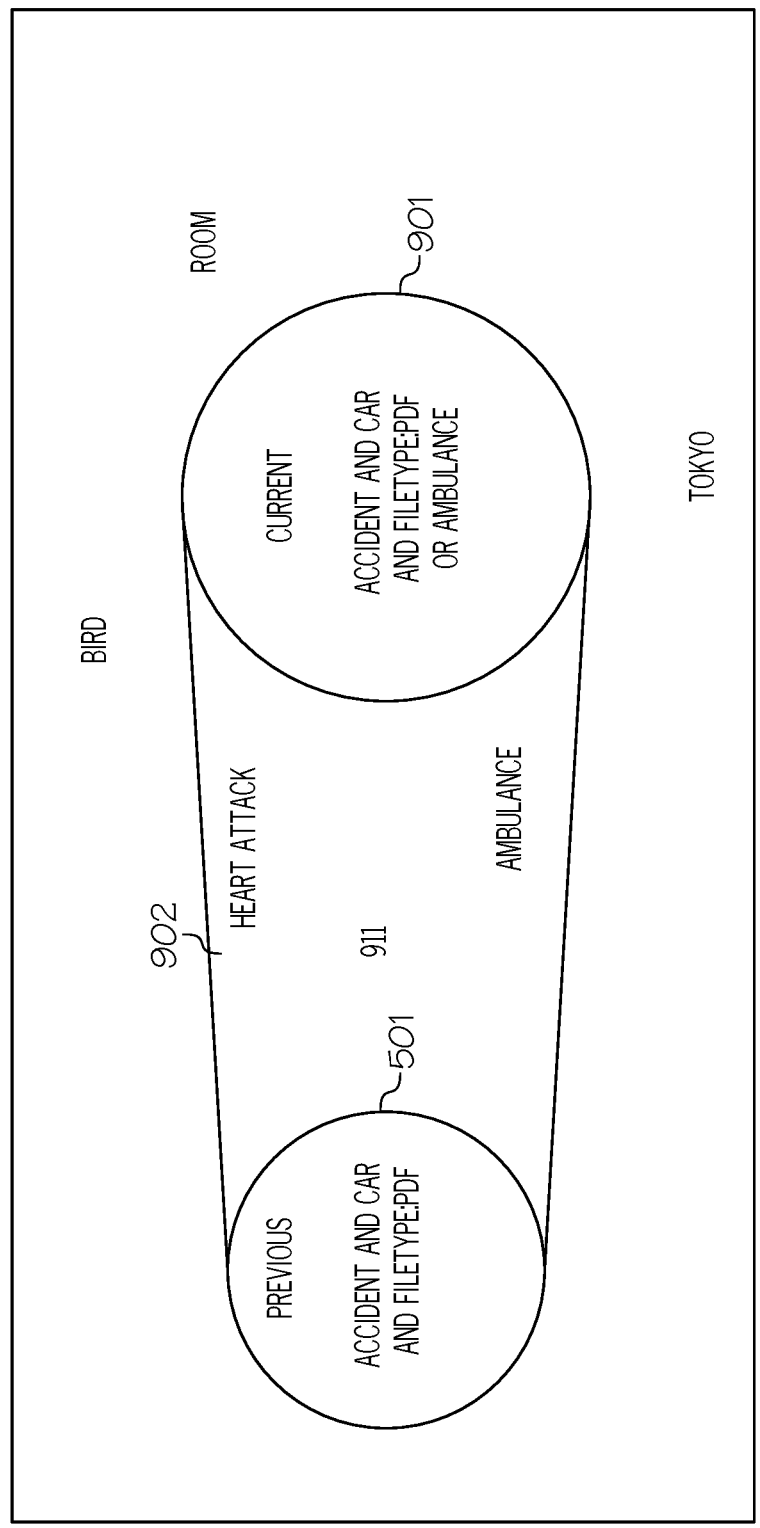
FIG. 9 illustrates depicting areas on the display of the client device representing the previous and current search results as well as a region between the areas representing the set of documents that were added from the OR logical operation that includes terms of interest for the set of documents in accordance with an embodiment of the present invention.
Figure 10:
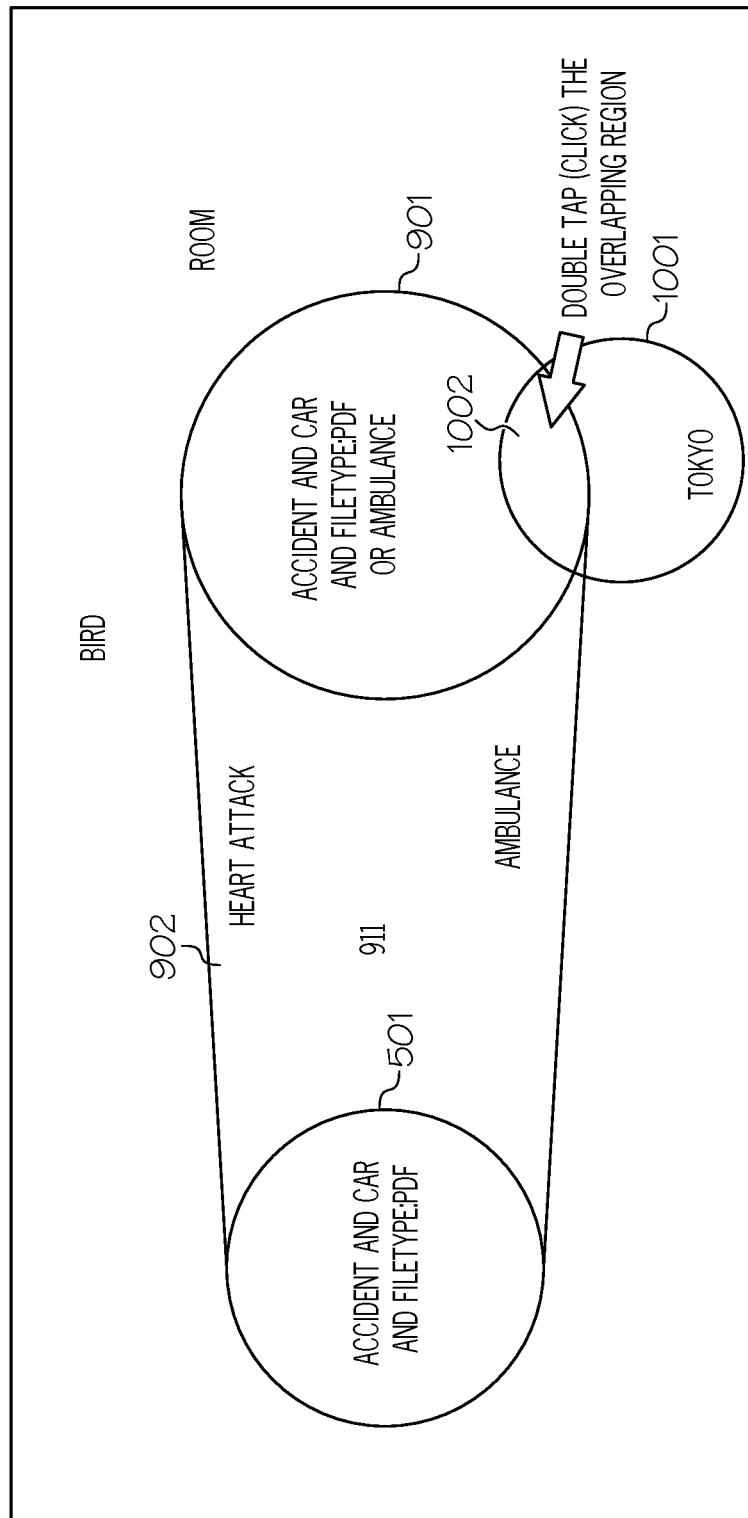
FIG. 10 illustrates adjusting the search result by performing the logical operation of AND on the set of prior search terms with the selected term of interest by the user selecting an overlapping region of the area representing the search result of the selected term of interest and the area representing the prior search result in accordance with an embodiment of the present invention.
Figure 11:
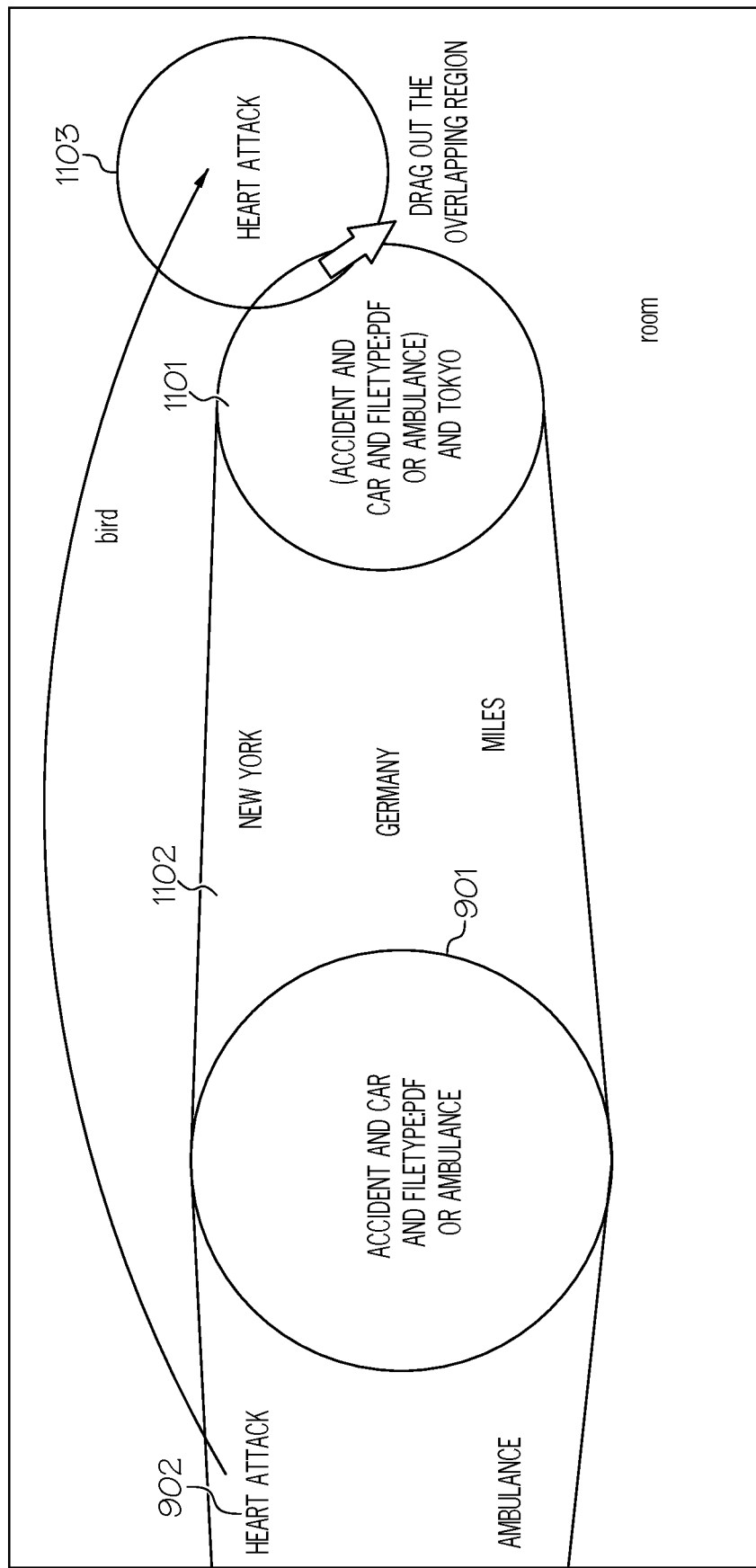
FIG. 11 illustrates depicting areas on the display of the client device representing the previous and current search results as well as a region between the areas representing the set of documents that were removed from the AND logical operation that includes terms of interest for the set of documents as well as illustrates adjusting the search result by performing the logical operation of NOT on the set of prior search terms with the selected term of interest by the user dragging out the area representing the search result of the selected term of interest in accordance with an embodiment of the present invention.
Figure 12:
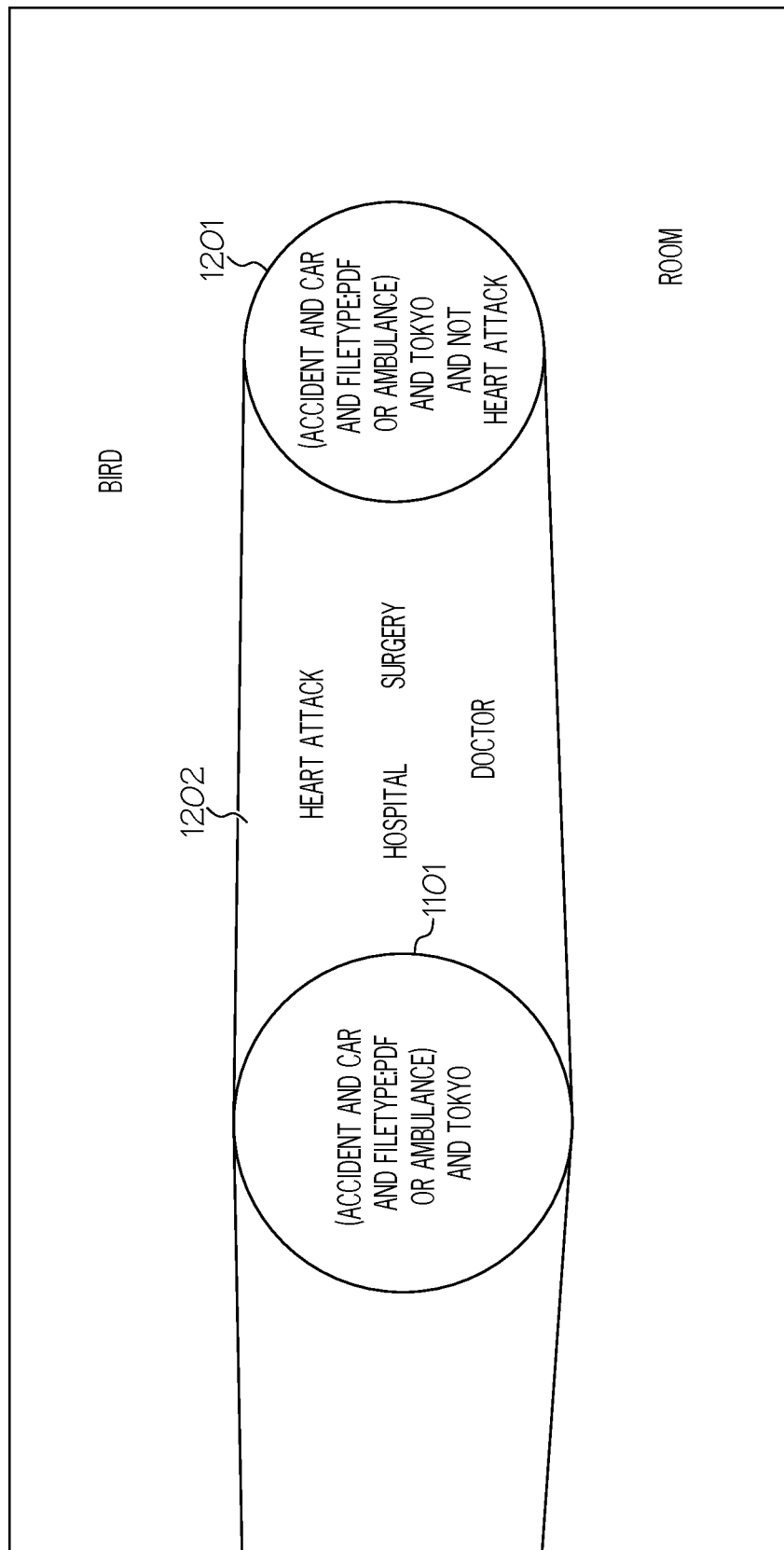
FIG. 12 illustrates depicting areas on the display of the client device representing the previous and current search results as well as a region between the areas representing the set of documents that were removed from the NOT logical operation that includes terms of interest for the set of documents in accordance with an embodiment of the present invention.
Figure 13:
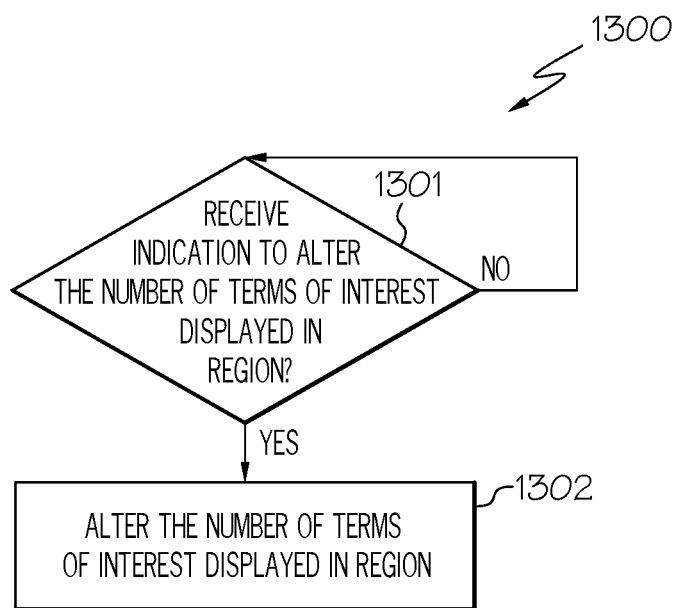
FIG. 13 is a flowchart of a method for expanding the number of terms of interest displayed in the region in accordance with an embodiment of the present invention.
Figure 14:
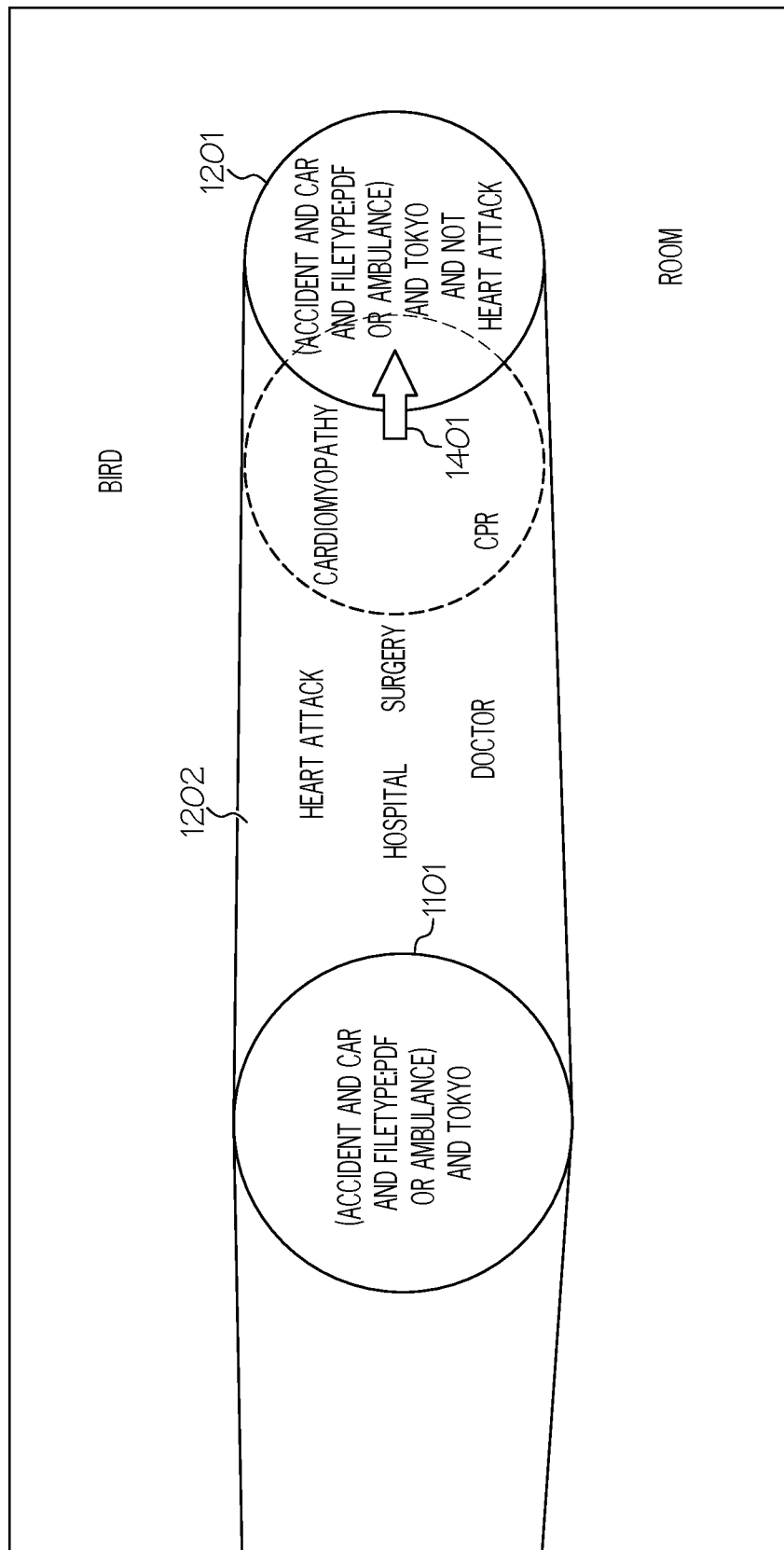
FIG. 14 illustrates expanding the number of terms displayed in the region in accordance with an embodiment of the present invention.

The principles of the present invention provide a means for providing an intuitive view as to how different terms or different searches will have an impact on the search results thereby improving the quality of subsequent searches as discussed below in connection with FIGS. 4A-4B and 5-14. FIGS. 4A-4B are a flowchart of a method for providing an intuitive view as to how different terms or different searches will have an impact on the search results. FIG. 5 illustrates depicting an area on the display of the client device representing a search result along with terms of interest being displayed outside the area. FIG. 6 illustrates selecting a term of interest. FIG. 7 illustrates depicting an area on the display of the client device representing a search result using the selected term of interest. FIG. 8 illustrates adjusting the search result by performing the logical operation of OR on the set of prior search terms with the selected term of interest by the user dragging and dropping the area representing the search result of the selected term of interest into the area representing the prior search result. FIG. 9 illustrates depicting areas on the display of the client device representing the previous and current search results as well as a region between the areas representing the set of documents that were added from the OR logical operation that includes terms of interest for the set of documents. FIG. 10 illustrates adjusting the search result by performing the logical operation of AND on the set of prior search terms with the selected term of interest by the user selecting an overlapping region of the area representing the search result of the selected term of interest and the area representing the prior search result. FIG. 11 illustrates depicting areas on the display of the client device representing the previous and current search results as well as a region between the areas representing the set of documents that were removed from the AND logical operation that includes terms of interest for the set of documents as well as illustrates adjusting the search result by performing the logical operation of NOT on the set of prior search terms with the selected term of interest by the user dragging out the area representing the search result of the selected term of interest. FIG. 12 illustrates depicting areas on the display of the client device representing the previous and current search results as well as a region between the areas representing the set of documents that were removed from the NOT logical operation that includes terms of interest for the set of documents. FIG. 13 is a flowchart of a method for expanding the number of terms of interest displayed in the region. FIG. 14 illustrates expanding the number of terms displayed in the region.

As stated above, FIGS. 4A-4B are a flowchart of a method 400 for providing an intuitive view as to how different terms or different searches will have an impact on the search results in accordance with an embodiment of the present invention.

Referring to FIG. 4A, in conjunction with FIGS. 1-3, in step 401, search system 102 receives a request from user 101 to perform a search using term(s) provided by user 101. For example, user 101 may have provided the terms "car," "accident" and "file" to search system 102 to be used by search system 102 to conduct its search, such as on the World Wide Web.

In step 402, search system 102 performs the search request using the term(s) provided by user 101.

In step 403, a determination is made by search system 102 as to whether a previous search has been performed.

If a pervious search has not been performed, then, in step 404, search system 102 depicts a representation of the search result as an area (e.g., bubble, circle) with terms of interest (e.g., "bird, "room," "ambulance," "Tokyo") displayed outside the area as shown in FIG. 5. In one embodiment, the area representing the search result represents a set of documents (e.g., web pages, articles, presentations) that were found in the performed search. In one embodiment, user 101 can access the set of documents by selecting the area representing the search result. In one embodiment, the visual representation shown in FIG. 5 is generated and displayed on the screen (e.g., display monitor 215) of client device 101 by search system 102.

FIG. 5 illustrates depicting an area 501 on display 215 of client device 101 representing a search result along with terms of interest being displayed outside the area in accordance with an embodiment of the present invention. As shown in FIG. 5, area 501 represents the search result of the search performed using the terms "accident," "car," and "file type PDF" for a user interested in looking for reports on car accidents. In one embodiment, area 501 represents the set of documents that were found in the search performed using the terms provided by user 101. In one embodiment, user 101 can access the set of the documents by selecting area 501, such as by selecting area 501 via mouse 213.

In one embodiment, the search was performed using the AND logical operation on the terms "accident," "car," and "file type PDF" (shown in the search string of "accident AND car AND filetype:pdf") as shown in FIG. 5. As also illustrated in FIG. 5, terms of interest to the search are displayed outside area 501, such as the terms "bird," "room," "ambulance," and "Tokyo." Terms of interest, as used herein, may include any of the following: terms with high or low correlation to the current result set, high frequency terms in the current result set, synonyms of the current query terms and facet values (e.g., geographic locations, file types).

Returning to FIG. 4A, in conjunction with FIGS. 1-3 and 5, in step 405, a determination is made by search system 102 as to whether user 101 selected one of the depicted terms of interest. That is, search system 102 determines whether it received a selection of one of the depicted terms of interest from user 101. In one embodiment, a term of interest is selected by user 101 tapping or clicking the term of interest, such as via mouse 213, as shown in FIG. 6.

FIG. 6 illustrates selecting a term of interest in accordance with an embodiment of the present invention. As show in FIG. 6, the term "ambulance" is selected (see arrow 601) by user 101.

Returning to FIG. 4A, in conjunction with FIGS. 1-3 and 5-6, if one of the depicted terms of interest is selected by user 101, then, in step 406, search system 102 performs a search using the selected term of interest.

In step 407, search system 102 depicts an area (e.g., bubble, circle) representing the search result of the search using the selected term of interest as shown in FIG. 7. In one embodiment, the area represents a set of documents (e.g., web pages, articles, presentations) that were found in the performed search. In one embodiment, user 101 can access the set of documents by selecting the area representing the search result. In one embodiment, the visual representation shown in FIG. 7 is generated and displayed on the screen (e.g., display monitor 215) of client device 101 by search system 102.

FIG. 7 illustrates depicting an area 701 on display 215 of client device 101 representing a search result using the selected term of interest in accordance with an embodiment of the present invention. As illustrated in FIG. 7, area 701 represents the search result of the search perform using the selected term of interest (e.g., "ambulance"). In one embodiment, area 701 represents the set of documents that were found in the search performed using the selected term of interest (e.g., "ambulance"). In one embodiment, user 101 can access the set of the documents by selecting area 701, such as by selecting area 701 via mouse 213.

Referring now to FIG. 4B, in conjunction with FIGS. 1-3 and 5-7, in step 408, a determination is made by search system 102 as to whether it received an indication to adjust the search result with the selected term. There are many ways that user 101 can indicate to adjust the search result by performing a subsequent search, such as by indicating to perform the logical operation of OR, AND or NOT using the selected term of interest and the terms used to conduct the prior search. The principles of the present invention are not to be limited in scope to such logical operations and may include any logical operation that could be performed to adjust the prior search results.

In one embodiment, user 101 may indicate to perform the logical operation discussed above in many ways, such as by dragging and dropping the area representing the search result of the selected term of interest into the area representing the prior search result, selecting an overlapping region of the area representing the search result of the selected term of interest with the area representing the prior search result or dragging out the area representing the search result of the selected term of interest as discussed further below. Each of these particular actions may uniquely indicate to perform a particular logical operation (e.g., logical AND operation). The principles of the present invention are not to be limited in scope to any particular manner (e.g., dragging and dropping) for indicating to search system 102 to adjust the prior search result by a performing a particular logical operation with the selected term of interest and the terms used in the prior search result. The principles of the present invention may utilize any manner for providing such an indication.

If search system 102 did not receive an indication to adjust the search result with the selected term, then a determination is made by search system 102 as to whether user 101 selected one of the depicted terms of interest in step 405.

If, however, search system 102 received an indication to adjust the search result with the selected term, then, in step 409, search system 102 performs a subsequent search that adjusts the prior search result by performing a logical operation, AND, OR or NOT, on the set of prior search terms with the selected term of interest by user 101 performing an operation on the area representing the search result of the selected term in connection with the area representing the prior search result.

In step 410, search system 102 depicts a region, such as on display 215 of client device 101, between the areas representing the previous and current search results, where the region represents a set of documents that is the difference between the previous and current search results and includes new terms of interest for that set of documents.

After depicting a region between the areas representing the previous and current search results, where the region represents a set of documents that is the difference between the previous and current search results, a determination is made by search system 102 as to whether user 101 selected one of the depicted terms of interest in step 405.

Examples discussing steps 409 and 410 are now provided below.

Referring to FIG. 8, FIG. 8 illustrates adjusting the search result by performing the logical operation of OR on the set of prior search terms with the selected term of interest by the user dragging and dropping the area representing the search result of the selected term of interest into the area representing the prior search result in accordance with an embodiment of the present invention. As illustrated in FIG. 8, user 101 indicates to perform the logical OR operation by dragging and dropping area 701 into area 501. That is, user 101 indicates to perform the logical OR operation using the selected term of interest "ambulance" with the terms used in the prior search result (e.g., "accident," "car," and "file type PDF"). In particular, as shown in FIG. 8, search system 102 will perform the logical OR operation of the term "ambulance" with the logical AND operation of the terms "accident, "car," and "file type PDF" (as shown in the search string "accident AND car AND filetype:pdf OR ambulance" in FIG. 9).

FIG. 9 illustrates depicting areas on display 215 of client device 101 representing the previous and current search results as well as a region between the areas representing the set of documents that were added from the OR logical operation that includes terms of interest for the set of documents in accordance with an embodiment of the present invention. As shown in FIG. 9, the search results of performing the logical OR operation using the selected term of interest "ambulance" with the terms used in the prior search result is depicted as area 901 (see search string "accident AND car AND filetype:pdf OR ambulance"). As also shown in FIG. 9, the previous search result is depicted as well (see area 501 which was previously discussed in connection with FIG. 5). In one embodiment, user 101 can access the set of documents represented by areas 501, 901 by selecting area 501, 901, such as by selecting area 501, 901 via mouse 213. In one embodiment, the visual representation shown in FIG. 9 is generated and displayed on the screen (e.g., display monitor 215) of client device 101 by search system 102.

FIG. 9 further illustrates a region 902 between areas 501, 901 representing the set of documents that were added from the OR logical operation that includes the terms of interest (e.g., "911," "heart attack," and "ambulance") for that set of documents. In one embodiment, user 101 can access the set of documents represented by region 902 by selecting region 902, such as via mouse 213.

In another example, referring to FIG. 10, FIG. 10 illustrates adjusting the search result by performing the logical operation of AND on the set of prior search terms with the selected term of interest by the user selecting an overlapping region of the area representing the search result of the selected term of interest and the area representing the prior search result in accordance with an embodiment of the present invention. As illustrated in FIG. 10, user 101 selects the term of interest of "Tokyo" which results in search system 102 depicting an area 1001 representing the search result using the term of "Tokyo." FIG. 10 further illustrates user 101 indicating to perform the logical AND operation by selecting an overlapping region 1002 of area 901 and area 1001. That is, user 101 indicates to perform the logical AND operation using the selected term of interest "Tokyo" with the terms used in the prior search result (e.g., "accident," "car," "file type PDF," and "ambulance"). In particular, as shown in FIG. 10, search system 102 will perform the logical AND operation of the term "Tokyo" with the previous conducted search ("accident AND car AND filetype:pdf OR ambulance").

FIG. 11 illustrates depicting areas on display 215 of client device 101 representing the previous and current search results as well as a region between the areas representing the set of documents that were removed from the AND logical operation that includes terms of interest for the set of documents in accordance with an embodiment of the present invention. As shown in FIG. 11, the search result of performing the logical AND operation using the selected term of interest "Tokyo" with the terms used in the prior search result is depicted as area 1101 (see search string "accident AND car AND filetype:pdf OR ambulance AND Tokyo"). As also shown in FIG. 11, the previous search result is depicted as well (see area 901 which was previously discussed in connection with FIG. 9). In one embodiment, user 101 can access the set of documents represented by areas 901, 1101 by selecting area 901, 1101, such as via mouse 213. In one embodiment, the visual representation shown in FIG. 11 is generated and displayed on the screen (e.g., display monitor 215) of client device 101 by search system 102.

FIG. 11 further illustrates a region 1102 between areas 901, 1101 representing the set of documents that were removed from the AND logical operation that includes the terms of interest (e.g., "New York," "Germany," and "miles") for that set of documents. In one embodiment, user 101 can access the set of documents represented by region 1102 by selecting region 1102, such as via mouse 213.

Furthermore, as shown in FIG. 11, region 902, including the terms of interest for the set of documents associated with that region, is also depicted.

In another example, referring to FIG. 11, FIG. 11 further illustrates adjusting the search result by performing the logical operation of NOT on the set of prior search terms with the selected term of interest by the user dragging out the area representing the search result of the selected term of interest in accordance with an embodiment of the present invention. As shown in FIG. 11, user 101 selects the term of interest of "heart attack" which results in search system 102 depicting an area 1103 (e.g., bubble, circle) representing the search result using the term of "heart attack." As further illustrated in FIG. 11, user 101 indicates to perform the logical NOT operation by dragging out area 1103.

FIG. 12 illustrates depicting areas on display 215 of client device 101 representing the previous and current search results as well as a region between the areas representing the set of documents that were removed from the NOT logical operation that includes terms of interest for the set of documents in accordance with an embodiment of the present invention. As shown in FIG. 12, the search result of performing the logical NOT operation using the selected term of interest "heart attack" with the terms used in the prior search result is depicted as area 1201 (see search string "accident AND car AND filetype:pdf OR ambulance AND Tokyo NOT heart attack"). As also shown in FIG. 12, the previous search result is depicted as well (see area 1101 which was previously discussed in connection with FIG. 11). In one embodiment, user 101 can access the set of documents represented by areas 1101, 1201 by selecting area 1101, 1201, such as via mouse 213. In one embodiment, the visual representation shown in FIG. 12 is generated and displayed on the screen (e.g., display monitor 215) of client device 101 by search system 102.

FIG. 12 further illustrates a region 1202 between areas 1101, 1201 representing the set of documents that were removed from the NOT logical operation that includes the terms of interest (e.g., "heart attack," "hospital," "surgery," and "doctor") for that set of documents. In one embodiment, user 101 can access the set of documents represented by region 1202 by selecting region 1202, such as via mouse 213.

Returning to step 403 of FIG. 4A, in conjunction with FIGS. 1-3 and 5-12, as discussed above, a determination is made by search system 102 as to whether a previous search has been performed.

If a previous search was performed, then, in step 411 search system 102 depicts the representations of the previous and current search results as two areas (e.g., areas 501, 901) such as shown in FIGS. 9-12 discussed above.

In step 412, search system 102 determines a set of documents that is the difference between the two searches as shown in FIGS. 9-12 discussed above.

In step 413, search system 102 depicts a region (e.g., region 902) representing the set of documents that includes terms of interest for that set of documents as shown in FIGS. 9-12 discussed above.

Upon depicting a region representing the set of documents that includes terms of interest for that set of documents, a determination is made by search system 102 as to whether user 101 selected one of the depicted terms of interest in step 405.

If user 101 did not select one of the depicted terms of interest, then, in step 414, a determination is made by search system 102 as to whether it received a subsequent search request from user 101.

If search system 102 received a subsequent search request from user 101, then, in step 415, search system 102 performs the subsequent search request and then depicts the representations of the previous and current search results as two areas in step 411 as shown in FIGS. 9-12 discussed above.

If, however, search system 102 did not receive a subsequent search request from user 101, then a determination is made by search system 102 as to whether user 101 selected one of the depicted terms of interest in step 405.

The number of terms of interest that are depicted for user 101 may be increased or decreased as discussed below in connection with FIGS. 13-14.

FIG. 13 is a flowchart of a method 1300 for expanding the number of terms of interest displayed in the region in accordance with an embodiment of the present invention.

Referring to FIG. 13, in conjunction with FIGS. 1-3 and 5-12, in step 1301, a determination is made by search system 102 as to whether it received an indication to alter the number of terms of interest displayed in a region (e.g., region 1202).

If search system 102 did not receive an indication to alter the number of terms of interest displayed in the region, then search system 102 continues to determine whether it received an indication to alter the number of terms of interest displayed in the region in step 1301.

If, however, search system 102 received an indication to alter the number of terms of interest displayed in a region, then, in step 1302, search system 102 alters the number of terms of interest displayed in the region as shown in FIG. 14.

FIG. 14 illustrates expanding the number of terms displayed in the region in accordance with an embodiment of the present invention. Referring to FIG. 14, in conjunction with FIG. 12, FIG. 14 illustrates user 101 dragging an area 1201 outward as shown by arrow 1401 so as to expand the number of terms displayed in region 1202. As a result of user 101 dragging area 1201 outward, new terms, such as "cardiomyopathy" and "CPR," are now displayed in area 1202 thereby providing user 101 more terms of interest to select.

Alternatively, user 102 may decrease the number of terms displayed in a region, such as region 1202, by dragging an area, such as area 1201, inward.

Using the principles of the present invention discussed herein, the user is presented with an intuitive view as to how different terms or different searches will have an impact on the search results thereby improving the quality of subsequent searches.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for improving the quality of subsequent searches, the computer program product comprising a computer readable storage medium having program code embodied therewith, the program code comprising the programming instructions for:
   receiving a request from a user to perform a first search using one or more terms provided by said user;
   performing said first search using said one or more terms provided by said user;
   depicting a first representation of a first search result of said first search as a first area with terms of interest displayed outside said first area, wherein said first area comprises a bubble or a circle, wherein said terms of interest comprise one or more of the following: correlated terms in connection with said first search result, high frequency terms in connection with said first search result, synonyms of said one or more provided terms and facet values; and
   depicting said first representation of said first search result of said first search as said first area with terms of interest displayed outside said first area in response to a previous search having not been performed.

2. The computer program product as recited in claim 1, wherein said first area represents a set of documents that were found in said first search.

3. The computer program product as recited in claim 2, wherein said set of documents is accessible by a user selecting said first area.

4. The computer program product as recited in claim 1, wherein the program code further comprises the programming instructions for:
   receiving a selection of one of said terms of interest displayed outside said first area;
   performing a second search using said selected term of interest in response to receiving said selection of said term of interest;
   depicting a second representation of a second search result of said second search using said selected term of interest as a second area; and
   performing a third search forming a third search result by performing a logical operation on said one or more provided terms with said selected term of interest in response to said user performing an operation on said second area in connection with said first area.

5. The computer program product as recited in claim 4, wherein the program code further comprises the programming instructions for:
   depicting a region between said first and second areas representing a set of documents that is the difference between said first and third search results in response to performing said third search, wherein said region includes new terms of interest for said set of documents.

6. The computer program product as recited in claim 4, wherein said logical operation is performed in response to said user preforming an operation selected from the group consisting of: dragging and dropping said second area into said first area, selecting an overlapping region of said first area and said second area and dragging out said second area.

7. The computer program product as recited in claim 1, wherein the program code further comprises the programming instructions for:
   depicting a second representation of a previous search result as a second area in response to a previous search having been performed.

8. The computer program product as recited in claim 7, wherein the program code further comprises the programming instructions for:
   depicting a region between said first and second areas representing a set of documents that is the difference between said previous search result and said first search result, wherein said region includes terms of interest for said set of documents.

9. The computer program product as recited in claim 8, wherein the program code further comprises the programming instructions for:
   altering a number of terms of interest depicted in said region in response to said user dragging one of said first and second areas inward or outward.

10. A system, comprising:
   a memory for storing a computer program for improving the quality of subsequent searches; and
   a processor connected to said memory, wherein said processor is configured to execute the program instructions of the computer program comprising:
      receiving a request from a user to perform a first search using one or more terms provided by said user;
      performing said first search using said one or more terms provided by said user;
      depicting a first representation of a first search result of said first search as a first area with terms of interest displayed outside said first area, wherein said first area comprises a bubble or a circle, wherein said terms of interest comprise one or more of the following: correlated terms in connection with said first search result, high frequency terms in connection with said first search result, synonyms of said one or more provided terms and facet values; and
      depicting said first representation of said first search result of said first search as said first area with terms of interest displayed outside said first area in response to a previous search having not been performed.

11. The system as recited in claim 10, wherein said first area represents a set of documents that were found in said first search.

12. The system as recited in claim 11, wherein said set of documents is accessible by a user selecting said first area.

13. The system as recited in claim 10, wherein the program instructions of the computer program further comprise:
   receiving a selection of one of said terms of interest displayed outside said first area;
   performing a second search using said selected term of interest in response to receiving said selection of said term of interest;
   depicting a second representation of a second search result of said second search using said selected term of interest as a second area; and
   performing a third search forming a third search result by performing a logical operation on said one or more provided terms with said selected term of interest in response to said user performing an operation on said second area in connection with said first area.

14. The system as recited in claim 13, wherein the program instructions of the computer program further comprise:
   depicting a region between said first and second areas representing a set of documents that is the difference between said first and third search results in response to performing said third search, wherein said region includes new terms of interest for said set of documents.

15. The system as recited in claim 13, wherein said logical operation is performed in response to said user preforming an operation selected from the group consisting of: dragging and dropping said second area into said first area, selecting an overlapping region of said first area and said second area and dragging out said second area.

16. The system as recited in claim 10, wherein the program instructions of the computer program further comprise:
   depicting a second representation of a previous search result as a second area in response to a previous search having been performed.

17. The system as recited in claim 16, wherein the program instructions of the computer program further comprise:
   depicting a region between said first and second areas representing a set of documents that is the difference between said previous search result and said first search result, wherein said region includes terms of interest for said set of documents.

18. The system as recited in claim 17, wherein the program instructions of the computer program further comprise:
   altering a number of terms of interest depicted in said region in response to said user dragging one of said first and second areas inward or outward.

* * * * *